Nov. 17, 1953  J. H. DONNELLY  2,659,518
MEASURING VALVE WITH RIGIDLY CONNECTED RECIPROCATING VALVES
Filed July 13, 1949
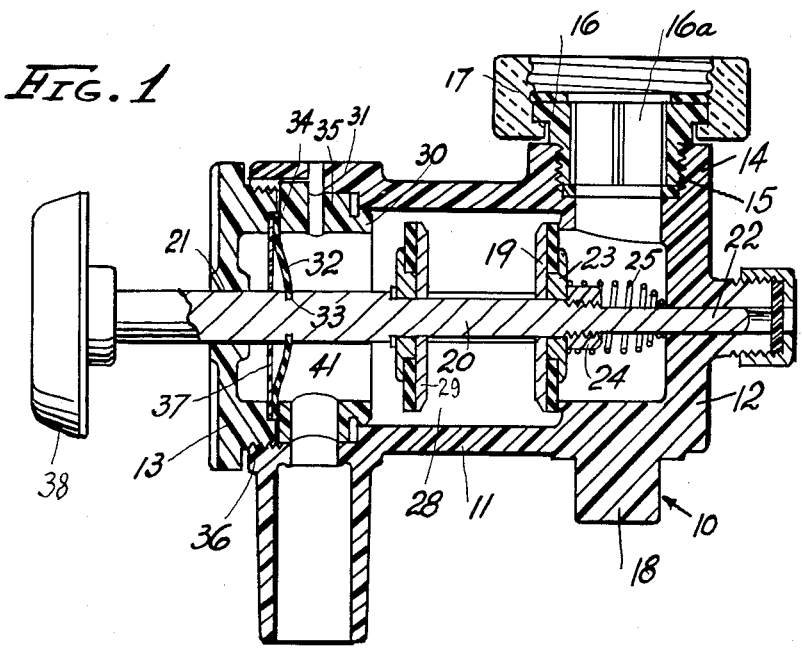
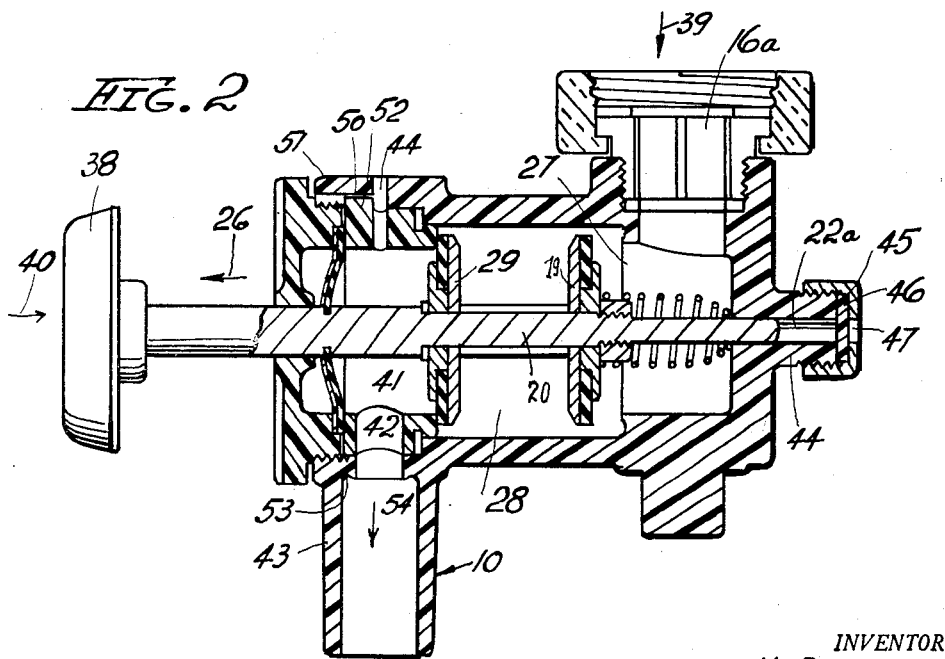
INVENTOR.
JOHN H. DONNELLY
BY J. B. Felshin
his ATTORNEY Patented Nov. 17, 1953

2,659,518

UNITED STATES PATENT OFFICE 2,659,518

MEASURING VALVE WITH RIGIDLY CONNECTED RECIPROCATING VALVES

John H. Donnelly, New York, N. Y.

Application July 13, 1949, Serial No. 104,539

9 Claims. (Cl. 222—449)

1

This invention relates to discharge valves for liquids and has for its main object to provide a device of this character which will normally not only cause the discharge of the liquid but will permit a permanent opening and free flow thereof when desired.

Another object of this invention is to provide a device of the character described which will permit a temporary flow of the liquid and automatically will permit a predetermined amount only to be discharged.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawing in which is shown various illustrative embodiments of this invention, Fig. 1 is a sectional view of my discharge valve showing the same in a position to discharge a predetermined amount, Fig. 2 is a similar sectional view showing the valve in a closed position.

Referring now to the drawing more in detail by character of reference, the numeral 10 indicates my valve in general, having a valve body 11, preferably of transparent material like an appropriate plastic and generally in a cylindrical form. The valve body has a closed rear end 12 and a screw threaded removable front end 13. Said rear end and said removable front end also should preferably be of transparent plastic or similar material. A cylindrical upward intake chamber 14 is provided at the rear of the valve body 11, having a screw threaded opening 15 into which may be secured by screw thread the flanged ring 16 carrying the coupler 17 for the container of the liquid, as will be understood.

Opposite to the intake is a downward, also cylindrical, projection or boss 18 which is used in certain holders for liquid. The valve disk 19 is secured on a valve stem 20 passing through the cover or top 13 as at 21 and resting in the aperture 22 in the rear end 12 of the device. A metal washer disk 23 is secured against the valve disk 19 as by the nut 24 and helical spring 25 is interposed between the washer 23 and the rear end 12 of the valve housing, having a normal tendency to push the valve stem 20 in a forward direction as indicated by the arrow 26, freeing the opening 27 between the rear portion of the valve housing and the intake opening 16a and the middle portion 28 of said housing, as shown in Fig. 2.

It will be seen that in such a normal position of the valve the liquid may flow through the intake opening 16a and through the rear valve opening 27 and will fill the middle portion 28 of the housing.

2

It is to be observed that a second valve disk 29 is secured on the stem 20 at a predetermined distance in front of the rear valve disk 19 which in said normal position of the device will sit against the valve seat 30, closing the central portion 28 of the valve housing against the front portion 41 thereof, so that the liquid only fills the central portion 28 of the valve housing.

The stem 20 is rotatable in the hole 21 of the front screw plug or cover 13 but a rubber sealing disk 32 is arranged in a slot 33 in the stem 20 which when the front of the device is closed will be pressed against the seat 34 in a sleeve member 35 set into the valve body. The plug or cover 13 of course will act through the screw threads 36.

The rubber diaphragm 32 is for sealing purposes, and to prevent wrinkling of it through the action of the screw threaded plug 13, a slip disk 37 is set in front of the rubber disk 32. Said slip disk is of appropriate metal or similar material and permits sliding motion of the screw plug thereover, without wrinkling the rubber diaphragm 32 and only exerting pressure thereon. The slip disk 37 also is of a somewhat flexible material so it can follow the movement of the rubber diaphragm as indicated in the two figures. An operating knob 38 is secured on the outer end of the valve stem 20.

It will be seen that in the normal position of the valve as shown in Fig. 2 the liquid entering through the opening 16a, as indicated by the arrow 39, will fill the rear portion of the valve housing and the middle portion thereof up to the closed front valve disk 29. When it is desired to discharge a predetermined amount, measured by the construction and dimensions of the valve, the valve stem 20 will be pushed rearwardly by the operating knob 38, as indicated by the arrow 40, until my valve construction will take up the position shown in Fig. 1.

In this position the front valve disk 29 will open while the rear valve disk 19 will sealingly close, and the liquid contained, measured and limited in the central portion 28 of the valve housing, may now flow forwardly into the front portion 41 of said housing.

The front portion is provided with an exit opening 42 to which is secured, as indicated, a downward discharge spout 43 and an air vent aperture 44 is provided in the top portion thereof for permitting the flowing out of the liquid through the spout 43.

Through the portion just described my valve will always discharge a predetermined amount of liquid. When the pressure on the knob 38 is released, after all the liquid has been discharged, the valve automatically will take up the position indicated in Fig. 2, closing the discharge of the liquid from the valve and opening the intake of the valve from the reservoir of the liquid and the operation may be repeated as long as there is liquid in the reservoir.

I want to remark that I may place my valve in such a position that each disk will be away from its seat and will provide an unhampered passing of the liquid from the reservoir to the spout 43. To attain this object the stem 20 will be pushed inwardly by the use of the knob 38, as indicated by the arrow 40, but to a limited extent only, said movement being stopped before the rear valve disk 19 will close on its seat whereby the front valve disk 29 will open and the rear valve disk will not yet close. In a way I may call that a natural position of my valve or an intermediate position between the closing of front disk alone or closing the rear disk only. Of course, to have the valve in said natural position, permitting a steady flow of liquid therefrom, the stem 20 will have to be kept in a partly rearwardly pushed position as by the operator.

The rearward cylindrical extension or knob 44 may also be provided in the rear end of my valve housing the aperture 22 continued therethrough as indicated at 22a and the same normally may be closed by a screw cap 45. Preferably a transparent plastic gasket disk 46 is interposed between the knob 44 and the screw cap 45. The screw cap is provided with a central aperture 47. This last described device is added to my invention for facilitating in the cleaning thereof. The screw cap 45 may be removed and the device cleaned through the apertures 22a and 22, of course, after the whole inner mechanism of the device is removed by opening th screw threaded top or cover 13, as will be understood.

The lining disk or gasket 46 may also be removed by the use of the aperture 47 in the screw cap 45 so that all the parts of the device can be thoroughly cleaned before reassembling same.

At 50 I indicate a slot in the screw threaded front rim 51 of the valve housing and the sleeve 35 has a corresponding key or projection 52 setting in said slot whereby the parts of the air vent 44 will be secured in registering position when the device is reassembled.

I also want to remark that an undercut 53 is provided in the spout 43 whereby the liquid flowing out will practically not even touch the walls of the spout but will flow in a stream in the center thereof, as indicated by the arrow 54.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. A measuring valve comprising an annular body open at its front end and provided with a rear end wall, said body having a top inlet opening adjacent its rear end, and being formed with a bottom outlet opening adjacent its front end, a plug closing the front open end of said body, said valve body being formed with an annular valve seat disposed forwardly of the inlet opening, and being formed with a second valve seat spaced from the first valve seat and disposed rearwardly of the outlet opening, said front plug being formed with an axial through opening, said rear end being formed with an opening coaxial with the opening in the front plug, a valve stem passing through the opening in the front plug, the rear end of said valve stem being received in the opening in said rear end of the body, a valve disc fixed on said valve stem and adapted to engage the valve seat adjacent the inlet opening, and a second valve disc on said valve stem spaced from the first valve disc and adapted to engage the valve seat adjacent the outlet opening, said valve stem being reciprocable to selectively engage said valve discs with said valve seats, and a knob on the front end of said valve stem, the opening in the rear end of the valve body being a through opening, a washer closing said opening and a cap screwed to said rear end and pressing said washer against said through opening in said rear end.

2. A measuring valve comprising an annular body open at its front end and provided with a rear end wall, said body having a top inlet opening adjacent its rear end, and being formed with a bottom outlet opening adjacent its front end, a plug closing the front open end of said body, said valve body being formed with an annular valve seat disposed forwardly of the inlet opening, and being formed with a second valve seat spaced from the first valve seat and disposed rearwardly of the outlet opening, said front plug being formed with an axial through opening, said rear end being formed with an opening coaxial with the opening in the front plug, a valve stem passing through the opening in the front plug, the rear end of said valve stem being received in the opening in said rear end of the body, a valve disc fixed on said valve stem and adapted to engage the valve seat adjacent the inlet opening, and a second valve disc on said valve stem spaced from the first valve disc and adapted to engage the valve seat adjacent the outlet opening, said valve stem being reciprocable to selectively engage said valve discs with said valve seats, and a knob on the front end of said valve stem, the opening in the rear end of the valve body being a through opening, a washer closing said opening and a cap screwed to said rear end and pressing said washer against said through opening in said rear end, a flexible diaphragm surrounding the valve stem and interposed between the disc adjacent the outlet opening and the front plug, said diaphragm being attached at its outer periphery relative to the body, and the inner periphery of the disc being attached to said valve stem.

3. A measuring valve comprising an annular body open at its front end and provided with a rear end wall, said body having a top inlet opening adjacent its rear end, and being formed with a bottom outlet opening adjacent its front end, a plug closing the front open end of said body, said valve body being formed with an annular valve seat disposed forwardly of the inlet opening, and being formed with a second valve seat spaced from the first valve seat and disposed rearwardly of the outlet opening, said front plug being formed with an axial through opening, said rear end being formed with an opening coaxial with the opening in the front plug, a valve stem passing through the opening in the front plug, the rear end of said valve stem being received in the opening in said rear end of the body, a valve disc fixed on said valve stem and adapted to engage the valve seat adjacent the inlet opening, and a second valve disc on said valve stem spaced from the first valve disc and adapted to engage the valve seat adjacent the outlet opening, said valve stem being reciprocable to selectively engage said valve discs with said valve seats, and a knob on the front end of said valve stem, the opening in the rear end of the valve body being a through opening, a washer closing said opening and a cap screwed to said rear end and pressing said washer against said through opening in said rear end, a spring interposed between the first mentioned disc and said rear end of the body, and a spout surrounding the outlet opening and extending downwardly from the body.

4. A measuring valve comprising a body, said body comprising a horizontal cylindrical wall, a rear end wall at the rear end of said cylindrical wall, an upwardly extending annular flange adjacent said rear end wall formed with an inlet through opening communicating with the interior of the body, said rear end wall being formed with an axial through opening, said body being formed with an annular valve seat adjacent to and in front of said inlet opening, said cylindrical wall being formed with an annular shoulder disposed forwardly of said valve seat, an annular valve seat member seated on said shoulder and forming a second valve seat spaced forwardly of the first valve seat, the front end of said cylindrical body being formed with internal screw threads, a front plug screwed to said screw threads and pressing said valve seat member against said annular shoulder, said cylindrical body being formed with a bottom outlet opening adjacent its front end and with a spout extending downwardly from said body and surrounding said outlet opening, said valve seat member being formed with an opening registering with the outlet opening, said front plug being formed with an axial through opening, a valve stem extending through the axial openings in said front plug and rear end wall and passing through said body, a valve disc fixed to the valve stem and adapted to engage the valve seat adjacent the inlet opening, a second valve disc fixed to the valve stem and adapted to engage the valve seat on said valve seat member, the distance between the valve discs being less than the distance between the valve seats so that said stem may be reciprocated to selectively engage the valve discs with said valve seats, and said valve stem being movable to a position where both valve discs are unseated.

5. A measuring valve comprising a body, said body comprising a horizontal cylindrical wall, a rear end wall at the rear end of said cylindrical wall, an upwardly extending annular flange adjacent said rear end wall formed with an inlet through opening communicating with the interior of the body, said rear end wall being formed with an axial through opening, said body being formed with an annular valve seat adjacent to and in front of said inlet opening, said cylindrical wall being formed with an annular shoulder disposed forwardly of said valve seat, an annular valve seat member seated on said shoulder and forming a second valve seat spaced forwardly of the first valve seat, the front end of said cylindrical body being formed with internal screw threads, a front plug screwed to said screw threads and pressing said valve seat member against said annular shoulder, said cylindrical body being formed with a bottom outlet opening adjacent its front end and with a spout extending downwardly from said body and surrounding said outlet opening, said valve seat member being formed with an opening registering with the outlet opening, said front plug being formed with an axial through opening, a valve stem extending through the axial openings in said front plug and rear end wall and passing through said body, a valve disc fixed to the valve stem and adapted to engage the valve seat adjacent the inlet opening, a second valve disc fixed to the valve stem and adapted to engage the valve seat on said valve seat member, the distance between the valve discs being less than the distance between the valve seats so that said stem may be reciprocated to selectively engage the valve discs with said valve seats, and said valve stem being movable to a position where both valve discs are unseated, and a spring interposed between the first valve disc and said rear end wall to normally press the valve stem forwardly, and a knob at the front end of the valve stem and exposed exteriorly of the valve body.

6. A measuring valve comprising a body, said body comprising a horizontal cylindrical wall, a rear end wall at the rear end of said cylindrical wall, an upwardly extending annular flange adjacent said rear end wall formed with an inlet through opening communicating with the interior of the body, said rear end wall being formed with an axial through opening, said body being formed with an annular valve seat adjacent to and in front of said inlet opening, said cylindrical wall being formed with an annular shoulder disposed forwardly of said valve seat, an annular valve seat member seated on said shoulder and forming a second valve seat spaced forwardly of the first valve seat, the front end of said cylindrical body being formed with internal screw threads, a front plug screwed to said screw threads and pressing said valve seat member against said annular shoulder, said cylindrical body being formed with a bottom outlet opening adjacent its front end and with a spout extending downwardly from said body and surrounding said outlet opening, said valve seat member being formed with an opening registering with the outlet opening, said front plug being formed with an axial through opening, a valve stem extending through the axial openings in said front plug and rear end wall and passing through said body, a valve disc fixed to the valve stem and adapted to engage the valve seat adjacent the inlet opening, a second valve disc fixed to the valve stem and adapted to engage the valve seat on said valve seat member, the distance between the valve discs being less than the distance between the valve seats so that said stem may be reciprocated to selectively engage the valve discs with said valve seats, and said valve stem being movable to a position where both valve discs are unseated, a spring interposed between the first valve disc and said rear end wall to normally press the valve stem forwardly, and a knob at the front end of the valve stem and exposed exteriorly of the valve body, a flexible diaphragm surrounding the valve stem and having its outer periphery portion clamped between said front plug and the valve seat member, and said valve stem being formed with an annular groove receiving the inner periphery of said diaphragm.

7. A measuring valve comprising a body, said body comprising a horizontal cylindrical wall, a rear end wall at the rear end of said cylindrical wall, an upwardly extending annular flange adjacent said rear end wall formed with an inlet through opening communicating with the interior of the body, said rear end wall being formed with an axial through opening, said body being formed with an annular valve seat adjacent to and in front of said inlet opening, said cylindrical wall being formed with an annular shoulder disposed forwardly of said valve seat, an annular valve seat member seated on said shoulder and forming a second valve seat spaced forwardly of the first valve seat, the front end of said cylindrical body being formed with internal screw threads, a front plug screwed to said screw threads and pressing said valve seat member against said annular shoulder, said cylindrical body being formed with a bottom outlet opening adjacent its front end and with a spout extending downwardly from said body and surrounding said outlet opening, said valve seat member being formed with an opening registering with the outlet opening, said front plug being formed with an axial through opening, a valve stem extending through the axial openings in said front plug and rear end wall and passing through said body, a valve disc fixed to the valve stem and adapted to engage the valve seat adjacent the inlet opening, a second valve disc fixed to the valve stem and adapted to engage the seat on said valve seat member, the distance between the valve discs being less than the distance between the valve seats so that said stem may be reciprocated to selectively engage the valve discs with said valve seats, and said valve stem being movable to a position where both valve discs are unseated, a spring interposed between the first valve disc and said rear end wall to normally press the valve stem forwardly, and a knob at the front end of the valve stem and exposed exteriorly of the valve body, a flexible diaphragm surrounding the valve stem and having its outer periphery portion clamped between said front plug and the valve seat member, and said valve stem being formed with an annular groove receiving the inner periphery of said diaphragm, and a metal disc clamped at its outer periphery between said front plug and diaphragm and surrounding the valve stem and being formed with a central opening, the periphery of which surrounds said stem forward of the diaphragm, and through which opening said stem passes.

8. A measuring valve comprising a body, said body comprising a horizontal cylindrical wall, a rear end wall at the rear end of said cylindrical wall, an upwardly extending annular flange adjacent said rear end wall formed with an inlet through opening communicating with the interior of the body, said rear end wall being formed with an axial through opening, said body being formed with an annular valve seat adjacent to and in front of said inlet opening, said cylindrical wall being formed with an annular shoulder disposed forwardly of said valve seat, an annular valve seat member seated on said shoulder and forming a second valve seat spaced forwardly of the first valve seat, the front end of said cylindrical body being formed with internal screw threads, a front plug screwed to said screw threads and pressing said valve seat member against said annular shoulder, said cylindrical body being formed with a bottom outlet opening adjacent its front end and with a spout extending downwardly from said body and surrounding said outlet opening, said valve seat member being formed with an opening registering with the outlet opening, said front plug being formed with an axial through opening, a valve stem extending through the axial openings in said front plug and rear end wall and passing through said body, a valve disc fixed to the valve stem and adapted to engage the valve seat adjacent the inlet opening, a second valve disc fixed to the valve stem and adapted to engage the seat on said valve seat member, the distance between the valve discs being less than the distance between the valve seats so that said stem may be reciprocated to selectively engage the valve discs with said valve seats, and said valve stem being movable to a position where both valve discs are unseated, a spring interposed between the first valve disc and said rear end wall to normally press the valve stem forwardly, a knob at the front end of the valve stem and exposed exteriorly of the valve body, a flexible diaphragm surrounding the valve stem and having its outer periphery portion clamped between said front plug and the valve seat member, said valve stem being formed with an annular groove receiving the inner periphery of said diaphragm, and a flexible metal disc clamped at its outer periphery between said front plug and diaphragm and surrounding the valve stem between said front plug and diaphragm and being formed with a central opening through which said stem passes, and said valve stem being mounted on the valve body for sliding, non-rotating engagement therewith.

9. A measuring valve for liquid comprising a hollow body closed both at the front and the rear, an intake opening for said body being provided in the rear, and a discharge opening in the front, a slidable valve stem in said body projecting through its front, a valve seat in said body spaced apart from the rear end thereof, and a second valve seat spaced apart from the front, a valve disk on the stem for each seat, the distance between said disks being less than the distance between said seats, whereby the forward moving of said stem will close said second front valve and open the rear valve permitting the flow of the liquid through said intake opening in the body of the valve and the rearward position of said stem closing the rear valve and permitting the discharge of the liquid in the body thereof through said front valve, the rear end of said stem being removably set into the closed rear of said body, the front of said body being removable and said stem then being removable with the front valve seat, whereby said valve stem with the valve disks thereon, as well as the spring and other members associated therewith, may all be removed from the body through the front thereof when it is desired to clean the device, said stem having a circular diaphragm and metal disk separately arranged thereon, in front of said second valve seat and with their outer peripheries in juxtaposition and secured in the sides of the body by said removable front end.

JOHN H. DONNELLY.

References Cited in the file of this patent

UNITED STATES PATENTS

| Number | Name | Date |
|---|---|---|
| 984,630 | Williams | Feb. 21, 1911 |
| 1,041,445 | Dittrich | Oct. 15, 1912 |
| 1,186,349 | Travis | June 6, 1916 |
| 1,342,173 | Joslin | June 1, 1920 |
| 1,585,025 | Gorschalki et al. | May 18, 1926 |
| 2,216,347 | Humbard | Oct. 1, 1940 |
| 2,248,958 | Christensen | July 15, 1941 |
| 2,464,030 | Engstrom | Mar. 8, 1949 |